United States Patent
Singh et al.

(10) Patent No.: US 8,514,696 B2
(45) Date of Patent: *Aug. 20, 2013

(54) MULTICAST TREE STATE REPLICATION

(75) Inventors: Ravi Singh, Burlingame, CA (US); Amit Shukla, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 13/021,318

(22) Filed: Feb. 4, 2011

(65) Prior Publication Data

US 2011/0128957 A1 Jun. 2, 2011

Related U.S. Application Data

(63) Continuation of application No. 12/183,289, filed on Jul. 31, 2008, now Pat. No. 7,903,545.

(51) Int. Cl.
*H04L 1/00* (2006.01)
*H04L 12/26* (2006.01)

(52) U.S. Cl.
USPC ............................................ 370/218; 370/221

(58) Field of Classification Search
USPC ....................................... 370/216–218, 221
See application file for complete search history.

(56) References Cited

U.S. PATENT DOCUMENTS

| | | | |
|---|---|---|---|
| 7,903,545 B1 | 3/2011 | Singh et al. | |
| 2006/0056303 A1 | 3/2006 | Aggarwal et al. | |
| 2006/0164974 A1 | 7/2006 | Ramalho et al. | |
| 2006/0250999 A1 | 11/2006 | Zeng et al. | |
| 2007/0019646 A1 | 1/2007 | Bryant et al. | |
| 2007/0268899 A1 | 11/2007 | Cankaya | |
| 2008/0205600 A1 | 8/2008 | Sparks et al. | |

OTHER PUBLICATIONS

Co-pending U.S. Appl. No. 12/183,289, filed Jul. 31, 2008 entitled "Multicast Tree State Replication" by Ravi Singh et al., 42 pages.
Fenner et al., Protocol Independent Multicast—Sparse Mode (PIM-SM): Protocol Specification (Revised), Network Working Group, RFC-4601, The Internet Society (2006), 112 pages.
Adams et al., Protocol Independent Multicast—Dense Mode (PIM-DM): Protocol Specification (Revised), Network Working Group, RFC-3973, The Internet Society (2005), 57 pages.
Bhattacharyya, An Overview of Source-Specific Multicast (SSM), Network Working Group, RFC-3569, The Internet Society (2003), 14 pages.

*Primary Examiner* — Ronald Abelson
(74) *Attorney, Agent, or Firm* — Harrity & Harrity, LLP

(57) ABSTRACT

A network device may include a first memory to store a primary multicast tree state table for storing next-hop information for a multicast tree corresponding to a multicast stream; a second memory to store a secondary multicast tree, different than the primary multicast tree, state table for storing the next-hop information for the multicast tree corresponding to the multicast stream; a receiver to receive a data unit from a neighbor network device, the data unit including information regarding a next-hop in the multicast tree; and one or more processors. The one or more processors may update the primary multicast tree state table based on the information regarding the next-hop in the multicast tree, and update the secondary multicast tree state table, in response to the one or more processors updates the primary multicast tree state table, based on the information regarding the next-hop in the multicast tree.

20 Claims, 12 Drawing Sheets

PRIMARY MULTICAST TREE STATE TABLE 366

| GROUP ADDR. 402 | UPSTR. IF 404 | UPSTR. ADDR. 406 | DWNSTR. IF 408 | DWNSTR. ADDR. 410 |
|---|---|---|---|---|
| 231.1.1.144 | A | 10.1.1.102 | B | 10.1.1.104 |
|  |  |  | C | 10.1.1.106 |
|  |  |  | D | 10.1.1.122 |
| 231.1.1.244 | A | 10.1.1.102 | C | 10.1.1.106 |

452 — 231.1.1.144 row
454 — 231.1.1.244 row

SECONDARY MULTICAST TREE STATE TABLE 700

| GROUP ADDR. 402 | UPSTR. IF 404 | UPSTR. ADDR. 406 | DWNSTR. IF 408 | DWNSTR. ADDR. 410 |
|---|---|---|---|---|
| 231.1.1.144 | A | 10.1.1.102 | B | 10.1.1.104 |
|  |  |  | C | 10.1.1.106 |
|  |  |  | D | 10.1.1.122 |
| 231.1.1.244 | A | 10.1.1.102 | C | 10.1.1.106 |

452 points to the first row; 454 points to the second.

PRIMARY MULTICAST TREE STATE TABLE 366'

| GROUP ADDR. 402 | UPSTR. IF 404 | UPSTR. ADDR. 406 | DWNSTR. IF 408 | DWNSTR. ADDR. 410 |
|---|---|---|---|---|
| 231.1.1.144 | A | 10.1.1.102 | B | 10.1.1.104 |
|  |  |  | C | 10.1.1.106 |
|  |  |  | D | 10.1.1.122 |
| 231.1.1.244 | A | 10.1.1.102 | C | 10.1.1.106 |
|  |  |  | D | 10.1.1.122 |

452 → 231.1.1.144 row; 454' → 231.1.1.244 row

SECONDARY MULTICAST TREE STATE TABLE 700'

| GROUP ADDR. 402 | UPSTR. IF 404 | UPSTR. ADDR. 406 | DWNSTR. IF 408 | DWNSTR. ADDR. 410 |
|---|---|---|---|---|
| 231.1.1.144 | A | 10.1.1.102 | B | 10.1.1.104 |
|  |  |  | C | 10.1.1.106 |
|  |  |  | D | 10.1.1.122 |
| 231.1.1.244 | A | 10.1.1.102 | C | 10.1.1.106 |
|  |  |  | D | 10.1.1.122 |

452 → 231.1.1.144 row
454' → 231.1.1.244 row

MULTICAST TREE STATE REPLICATION

RELATED APPLICATION

This application is a continuation of U.S. patent application Ser. No. 12/183,289, filed Jul. 31, 2008, which is incorporated herein by reference.

BACKGROUND INFORMATION

In an increasingly networked world, digital networks deliver a plethora of data services to end-users. For example, end-users may receive video and audio streams over a network, such as a packet-based network. Video streams may include Internet Protocol Television (IPTV), for example, in which digital television signals may be delivered to consumers using the Internet Protocol (IP).

Some data services, including IPTV, may use a multicasting protocol. "Multicasting" generally refers to the delivery of data to a group of destinations. To conserve bandwidth, multicast data may be transmitted once over each link of the network. Data may be replicated when the path to the destinations splits between multiple links. The bandwidth savings using multicasting may be significant.

Networks may use routers, switches, and other network devices for receiving and forwarding multicast data. Such network devices may receive multicast packets through one interface (e.g., port) and may determine which interfaces to forward the packets.

SUMMARY

A network device may include a first memory to store a primary multicast tree state table for storing next-hop information for a multicast tree corresponding to a multicast stream; a second memory to store a secondary multicast tree, different than the primary multicast tree state table, for storing the next-hop information for the multicast tree corresponding to the multicast stream; a receiver to receive a data unit from a neighbor network device, the data unit including information regarding a next-hop in the multicast tree; and one or more processors. One or more processors may update the primary multicast tree state table based on the information regarding the next-hop in the multicast tree, and update the secondary multicast tree state table, in response to the one or more processors updates the primary multicast tree state table, based on the information regarding the next-hop in the multicast tree.

A method may comprise receiving a data unit in a network device from another device, the data unit including information regarding a next-hop for a multicast stream in a multicast tree; updating a primary multicast tree state table based on the information regarding the next-hop for the multicast stream in the multicast tree; and updating a secondary multicast tree state table, different than the primary multicast tree state table, when the primary multicast tree state table is updated, based on the information regarding the next-hop for the multicast stream in the multicast tree.

A computer-readable medium may include instructions executable by at least one processor. The computer-readable medium may include one or more instructions to receive a first data unit in a network device from a neighbor device, the first data unit including information regarding a next-hop of a multicast stream in a multicast tree; one or more instructions to update a primary multicast tree state table in response to the information regarding the next-hop of the multicast stream in the multicast tree, where the primary multicast tree state table stores next-hop information for the multicast tree; one or more instructions to formulate a second data unit when the one or more instructions update the primary multicast tree state table, the second data unit including information indicative of the update to the primary multicast tree state table; and one or more instructions to send the second data unit from a primary control unit to a secondary control unit of the network device for updating a secondary multicast tree state table, where the secondary multicast tree state table stores the next-hop information for the multicast tree.

A method may include receiving a join/prune data unit in a network device from a neighbor device, the join/prune data unit including information regarding adding or removing next-hop information associated with a multicast stream in a multicast tree; updating the primary multicast tree state table based on the information regarding the next-hop of the multicast stream in the multicast tree; formulating a second data unit, when the primary multicast tree state table is updated, the second data unit including information indicative of the update to the multicast tree state table; and sending the second data unit from a primary control unit to a secondary control unit of the network device.

A network device may include means for determining when a secondary control unit of the network devices is online; means for generating data units indicating a state of a primary multicast tree state table when the secondary control unit is online, where the primary multicast tree state table stores next-hop information for a multicast tree corresponding to a multicast stream; means for sending the generated data units from a primary control unit to the secondary control unit of the network device; means for receiving the generated data units in the secondary control unit; and means for populating a secondary multicast tree state table based on the received join/prune packets.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 4 is a diagram of an exemplary primary multicast tree state table for a network device;

FIG. 7 is a block diagram of an exemplary secondary multicast tree state table;

FIG. 9 is a block diagram of an exemplary updated primary multicast tree state table;

FIG. 11 is a block diagram of an exemplary updated secondary multicast tree state table.

DETAILED DESCRIPTION

The following detailed description refers to the accompanying drawings. The same reference numbers in different drawings may identify the same or similar elements. Also, the following detailed description does not limit the invention.

Network devices, such as routers, may store next-hop information for multicast streams in multicast tree state tables. Such tables may allow for the network devices to forward multicast streams on the proper interfaces (e.g., ports). Embodiments described herein may allow for the preservation (e.g., replication) of multicast tree state tables across multiple control planes in network devices, such as routers, in the event of the unavailability (e.g., failure or offline) of one of the control planes, for example.

Exemplary Environment

Figure 1:
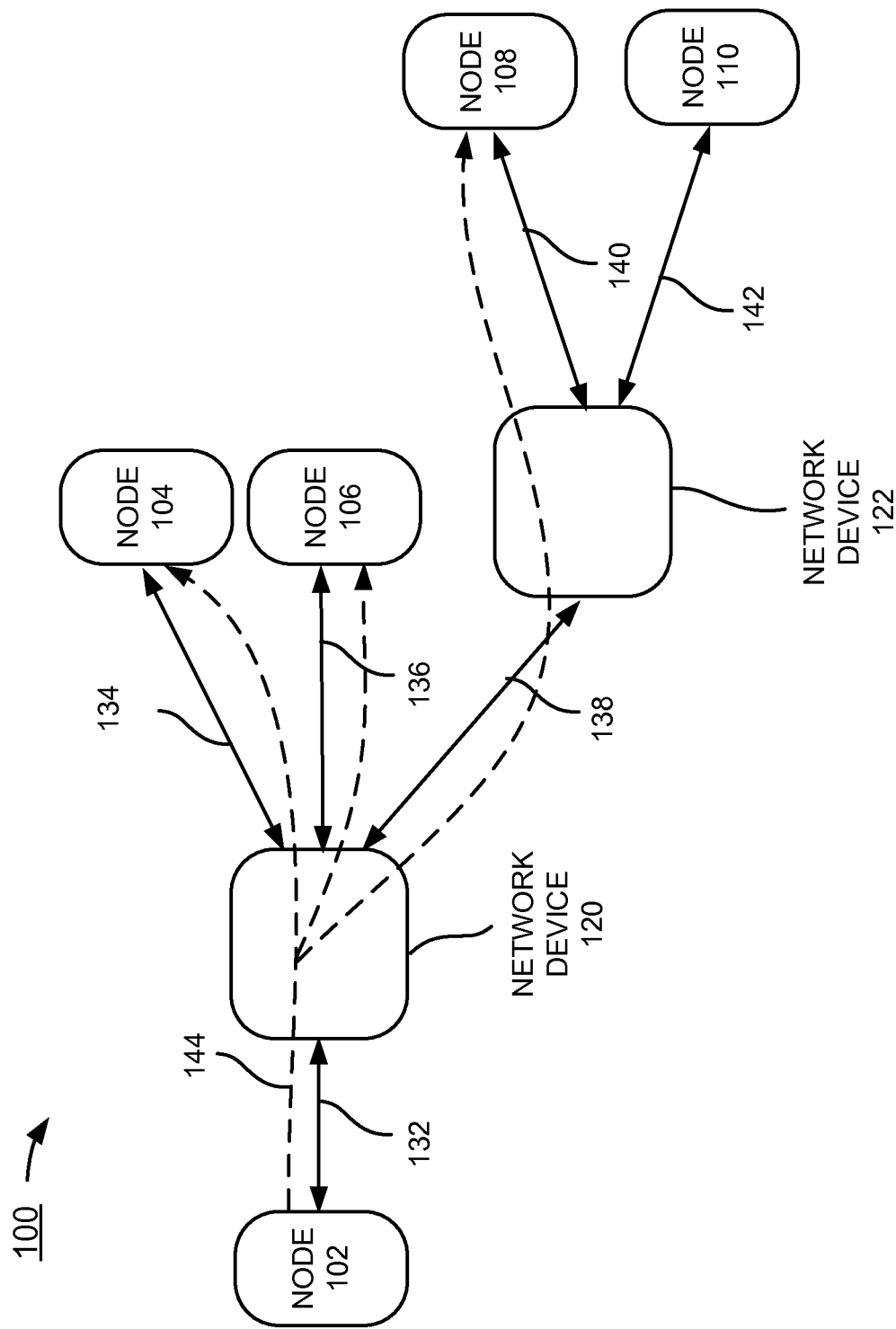
FIG. 1 is a block diagram of an exemplary network in which one or more embodiments disclosed herein may be implemented.

FIG. 1 is a block diagram of an exemplary network 100 that may include nodes 102, 104, 106, 108, and 110, and network devices 120 and 122. Nodes 102, 104, and 106 may communicate with network device 120 over communication links 132, 134, and 136, respectively. Network device 120 may communicate with network device 122 over communication link 138. Nodes 108 and 110 may communicate with network device 122 over communication links 140 and 142, respectively.

In practice, there may be more, different, or fewer devices or a different arrangement of devices than what is shown in FIG. 1. For example, network 100 may include thousands or even millions of nodes. Further, one or more of components 102-122 may be remotely located from each other, e.g., one or more of components 102-122 may be geographically diverse. Moreover, one or more of components 102-122 may perform one or more functions described as being performed by another component of network 100. Although arrows in FIG. 1 suggest communication directly between components, communication may be indirect through one or more networks. Communication among components 102-122 may be accomplished via wired and/or wireless communication connections.

Nodes 102-110 may include computers, telephones, personal digital assistants, or any other communication devices that may transmit or receive data. Nodes 102-110 may include, for example, computers that exchange data through network devices 120 and 122. Nodes 102-110 may also include any other communication device, including among other things: a camcorder, a desktop computer, a laptop, a portable music player, a mobile telephone, or a stationary public-switched telephone network telephone.

Network devices 120 and 122 may include routers, switches, packet forwarding engines, firewalls, or any other network devices capable of receiving and forwarding packets. Network devices 120 and 122 may receive data from one node and may forward the data to one or more other nodes. For example, network device 120 may receive a packet from node 102 and may forward the packet to node 104. For multicasts, network devices 120 or 122 may receive data from one node and may forward the data to a group of nodes. For example, as shown in FIG. 1, network device 120 may receive a multicast stream 144 (e.g., a group of packets) and may forward the packets of multicast stream 144 to node 104, node 106, and network device 122. Network device 122 may receive multicast stream 144 from network device 120 and may forward multicast stream 144 to node 108.

Exemplary Network Device

Figure 2:
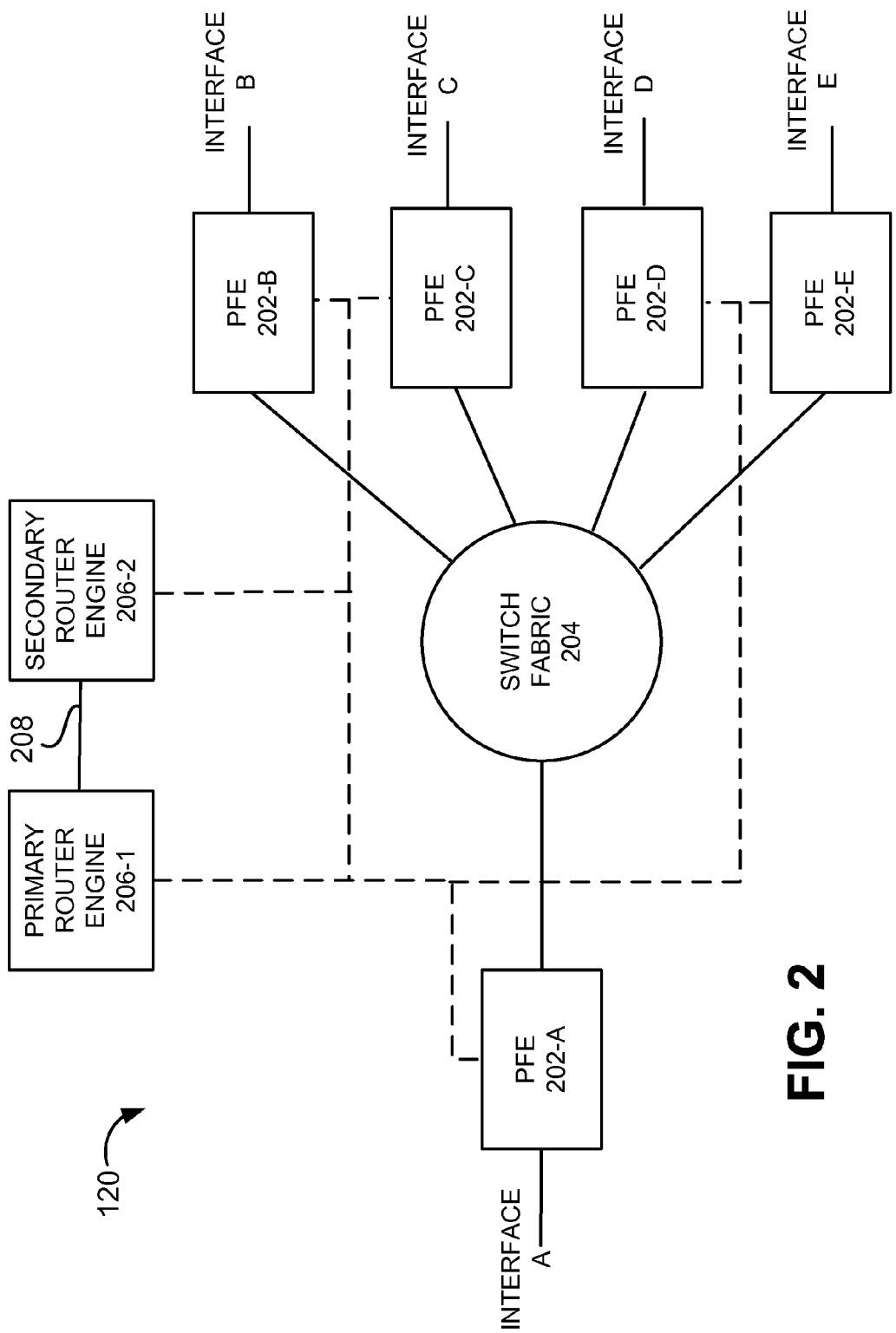
FIG. 2 is a block diagram of exemplary components of a network device.

FIG. 2 is a block diagram of exemplary components of network device 120. Network device 122 may be similarly configured to network device 120. Network device 120 may include packet forwarding engines 202-A through 202-E (collectively "PFEs 202," individually "PFE 202-x"), a switch fabric 204, a primary routing engine (RE) 206-1, a secondary RE 206-2, and a bus 208. Network device 120 may include other or different components (not shown) that aid in receiving, transmitting, and/or processing data. For example, there may be more than or fewer than five PFEs. Moreover, other configurations of components in network device 120 are possible.

Primary RE 206-1 may perform high level management functions for network device 120. As such, primary RE 206-1 may also be referred to as a "control unit" or a "control plane." For example, primary RE 206-1 may communicate with other network devices, networks, and/or systems connected to network device 120 to exchange information regarding network topology. Primary RE 206-1 may create routing tables and/or multicast tree tables based on the network topology information, create forwarding tables based on the routing tables, and forward the forwarding tables to PFEs 202. PFEs 202 may use the forwarding tables to perform route lookups for incoming packets. Primary RE 206-1 may also perform other general control and monitoring functions for network device 120.

Primary RE 206-1 may implement a multicast routing protocol that may provide one-to-many and/or many-to-many distribution of packets over a network. In one embodiment, primary RE 206-1 may implement the Protocol-Independent Multicast (PIM) protocol as specified in the Internet Engineering Task Force (IETF) Request for Comments (RFC) 4601 (PIM—Sparse Mode (SM)), IETF RFC 3973 (PIM—Dense Mode (DM)), or IETF RFC 3569 (PIM—Source Specific Multicast (SSM)).

Secondary RE 206-2 may provide backup functionality to primary RE 206-1. As such, secondary RE 206-2, like primary RE 206-1, may also be considered a control unit or a control plane. Secondary RE 206-2 may be able to perform all of the functions of primary RE 206-1. For example, should primary RE 206-1 be unavailable (e.g., fail or be taken offline for maintenance), network device 120 may switch from using primary RE 206-1 to using secondary RE 206-2. Network device 120 may include a switch (not shown) to switch from use of primary RE 206-1 to secondary RE 206-2, and vice versa.

Bus 208 may permit communication between primary RE 206-1 and secondary RE 206-2. For example, bus 208 may carry information between primary RE 206-1 and secondary RE 206-2 so that secondary RE 206-2 is ready to replace primary RE 206-1 when needed, e.g., when primary RE 206-1 fails.

PFEs 202 may each connect to primary RE 206-1 and secondary RE 206-2 (REs 206) and switch fabric 204. Connections between PFEs 202 and REs 206 are indicated by dashed lines in FIG. 2. PFEs 202 may receive or transmit data on physical interfaces (e.g., ports) connected to a network, such as a wide area network (WAN), a local area network (LAN), or another type of network. Each physical interface could be one of many types of transport media, such as optical fiber or Ethernet cable. Data on the physical interfaces may be formatted according to one of several protocols, such as the synchronous optical network (SONET) standard, an asynchronous transfer mode (ATM) technology, or Ethernet. The data may take the form of data units, where each data unit may include, for example, a packet, cell, or datagram; a fragment of a packet, cell, or datagram; a group of packets, cells, or datagrams; or other types or arrangements of data.

A PFE 202-*x* may process incoming data units prior to transmitting the data units to another PFE or the network. To facilitate this processing, PFE 202-*x* may perform a route lookup for the data unit using a forwarding table to determine destination information. If the destination information indicates that the data unit should be sent out on a physical interface connected to PFE 202-*x*, then PFE 202-*x* may prepare the data unit for transmission by, for example, adding any necessary headers, and transmitting the data units through a physical interface. If the destination information indicates that the data unit should be sent out on a physical interface not connected to PFE 202-*x*, then PFE 202-*x* may transfer the data unit to another PFE 202-*x* through switch fabric 204. Switch fabric 204 may carry the data units from one PFE 202-*x* to another PFE 202-*x*.

Exemplary Router Engine

Figure 3:
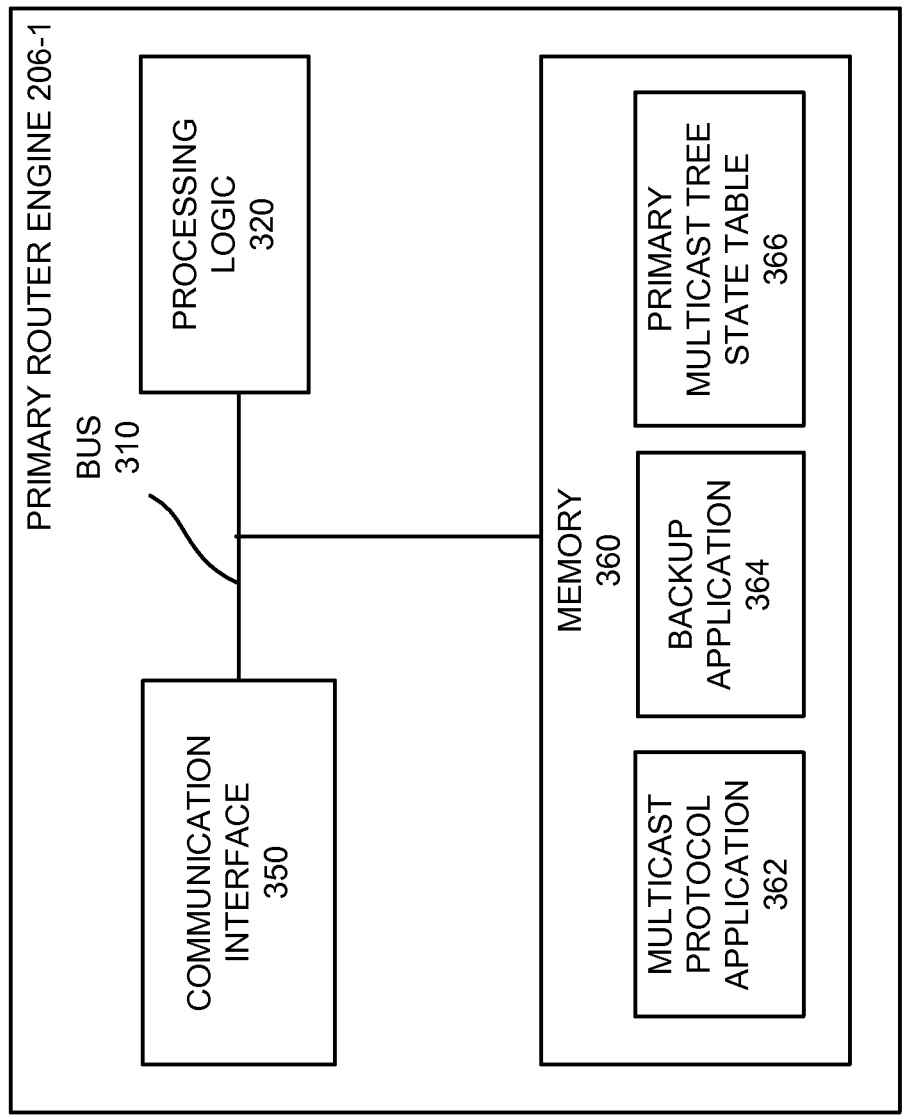
FIG. 3 is a block diagram of exemplary components of a router engine.

FIG. 3 is a block diagram of exemplary components of primary RE 206-1. Secondary RE 206-2 may be configured similarly to primary RE 206-1. Primary RE 206-1 may include a bus 310, processing logic 320, a communication interface 350, and a memory 360. Primary RE 206-1 may include other or different components (not shown) that aid in receiving, transmitting, and/or processing data. Moreover, other configurations of components in primary RE 206-1 are possible.

Bus 310 may permit communication among the components of primary RE 206-1. Processing logic 320 may include any type of processor or microprocessor that interprets and executes instructions. Processing logic 320 may include an application specific integrated circuit (ASIC), field programmable gate array (FPGA), or the like.

Communication interface 350 may include any transceiver-like mechanism that enables primary RE 206-1 to communicate with other devices, systems, and/or components of network device 120. For example, communication interface 350 may include mechanisms for communicating with nodes 102-110, PFEs 202, secondary RE 206-2, or network device 122, via one or more networks.

Memory 360 may include a random access memory (RAM) or another type of dynamic storage device that stores information and instructions for execution by processing logic 320, a read only memory (ROM) or another type of static storage device that stores static information and instructions for processing logic 320, and/or some other type of magnetic or optical recording medium and its corresponding drive for storing information and/or instructions. In one implementation, memory 360 may include a multicast protocol application 362, a backup application 364, and a primary multicast tree state table 366 (also referred to herein as "state table 366" or "primary state table 366").

Multicast protocol application 362 may implement a protocol that provides one-to-many and/or many-to-many distribution of data units over a network. Multicast protocol application 362 may provide for the following protocols: PIM-SM, PIM-DM, and/or PIM-SSM. Multicast protocol application 362 may maintain and update primary multicast tree state table 366, which may store next-hop information about multicast trees for forwarding multicast streams. Backup application 364 may send information, such as information stored in primary multicast tree state table 366, to secondary RE 206-2, for example, for redundancy purposes should primary RE 206-1 be unavailable.

Primary RE 206-1 may perform these and certain other acts in response to processing logic 320 executing software instructions contained in a computer-readable medium, such as memory 360. A computer-readable medium may be defined as one or more tangible memory devices. The software instructions, for example, may be read into memory 360 from another computer-readable medium or from another device via communication interface 350.

As mentioned above, secondary RE 206-2 may be configured similarly to primary RE 206-1. In the case of secondary RE 206-2, primary state table 366 may be replaced by a secondary multicast tree state table. In one embodiment, such a secondary multicast tree state table may include a backup to primary state table 366. Further, in the case of secondary RE 206-2, backup application 364 may receive information from primary RE 206-2, for example, for redundancy purposes should primary RE 206-1 be unavailable.

Exemplary Multicast Tree State Table

FIG. 4 is a diagram of exemplary primary multicast tree state table 366 for network device 120. Primary state table 366 may identify and specify multicast trees (e.g., the upstream and downstream interfaces and network addresses) for multicast streams. As described above, primary state table 366 may be stored in memory 360 of primary RE 206-1.

Primary state table 366 may include a group address field 402, an upstream interface (IF) field 404, an upstream address field 406, a downstream interface (IF) field 408, and a downstream address field 410. The fields in primary state table 366 are for exemplary purposes. Primary state table 366 may include additional, different, or fewer fields than illustrated in FIG. 4. For example, in one embodiment, downstream address field 410 may not be present.

Group address field 402 may identify the network address, such as an IP address, of a multicast stream. The network address in group address field 402 may uniquely identify the multicast stream and may not be associated with any one particular node or network device. Upstream IF field 404 may identify the interface for receiving data for the multicast stream associated with the network address in the corresponding group address field 402. Upstream address field 406 may identify the network address from which data for the multicast stream associated with the network address in corresponding group address field 402 is received.

Downstream IF field 408 may identify the interfaces on which data for the multicast stream associated with the network address in corresponding group address field 402 may be forwarded. Downstream address field 410 may identify the network addresses of the downstream nodes and/or devices receiving data for the multicast stream identified in corresponding group address field 402.

Figure 5:
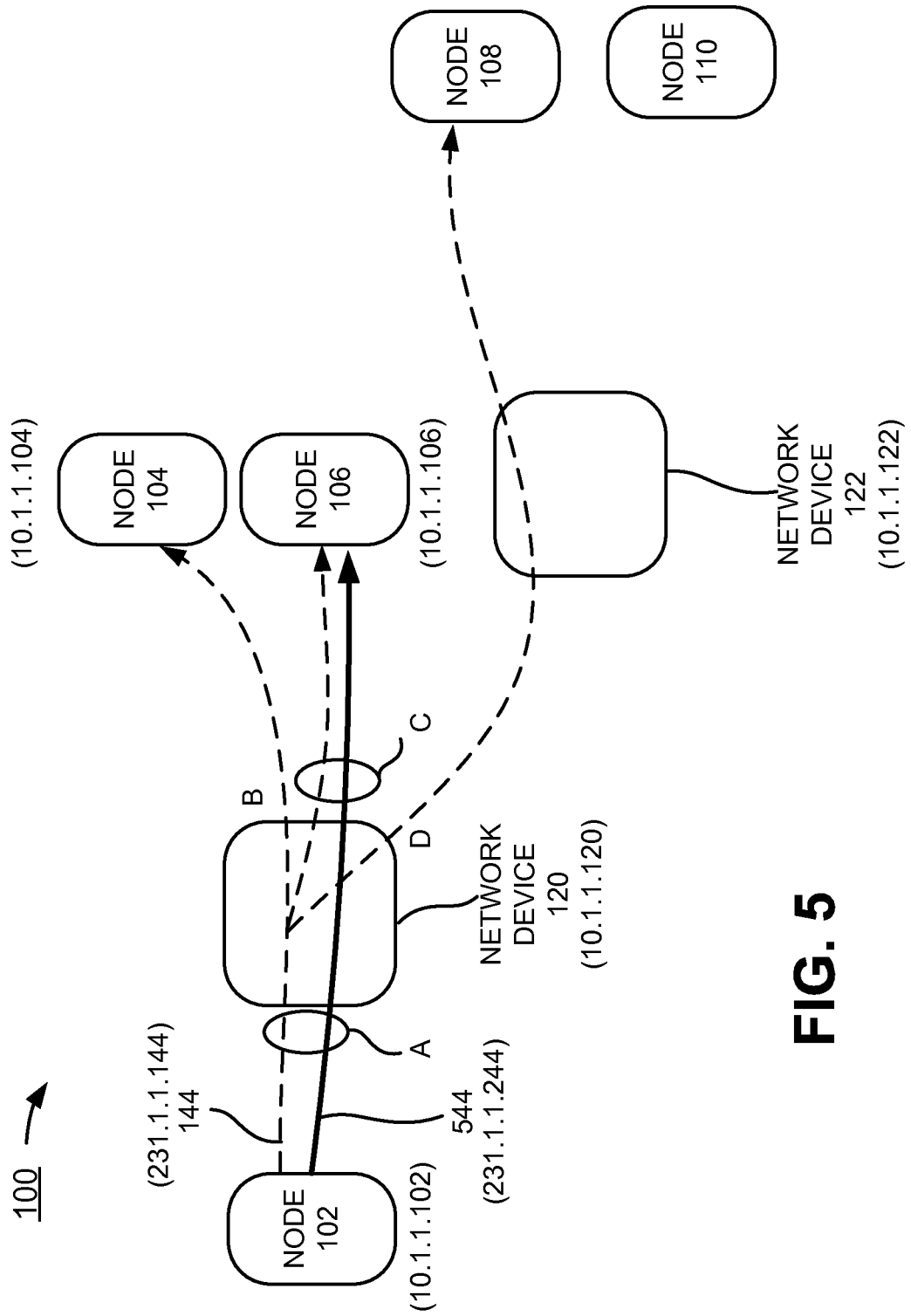
FIG. 5 is a block diagram of the exemplary network of FIG. 1 in a different state.

An exemplary primary state table 366 is described with respect to FIG. 5, which is a block diagram of network 100 of FIG. 1 in a different state. FIG. 5 includes the devices and nodes shown in FIG. 1, but communication links 132 through 142 have been omitted for simplicity. In addition, FIG. 5 includes an additional multicast stream 544 not shown in FIG. 1. FIG. 5 also includes the network addresses of nodes 102-106 (e.g., 10.1.1.102, 10.1.1.104, and 10.1.1.106, respectively) and network devices 120 and 122 (10.1.1.120 and 10.1.1.122, respectively). FIG. 5 also labels the interfaces A, B, C, and D of network device 120 through which multicast streams 144 and 544 are passing in this example.

As shown in FIG. 5, network device 120 may keep track of two multicast streams, e.g., stream 144 and stream 544. As such, primary state table 366 may include two records, e.g., record 452 and record 454, as shown in FIG. 4.

Record 452 may identify a group address of 231.1.1.144, which is associated with stream 144 in this example. As indicated in record 452, network device 120 may receive multicast stream 144 on interface A (identified in upstream IF field 404) from node 102 (identified in upstream address field 406). Network device 120 may send multicast stream 144 over interface B, C, and D (identified in downstream IF field 408) to nodes 104 and 106 and network device 122 (identified in downstream address field 410), respectively.

Record 454 may identify a group address of 231.1.1.244 in field 402, which is associated with stream 544 in this example. As indicated in record 454, network device 120 may receive multicast stream 544 on interface A (identified in upstream IF field 404) from node 102 (identified in upstream address field 406). Network device 120 may send multicast stream 544 over interface C (identified in downstream IF field 408) to node 104 (identified in downstream address field 410).

As mentioned above, primary state table 366 may include additional, different, or fewer fields than illustrated in FIG. 4. For example, primary state table 366 may include a rendezvous point (RP) address field (not shown). Such an RP address field may identify the network address to which sources may send multicast streams for distribution as the multicast stream associated with the network address in group address field 402. In one embodiment, primary state table 366 may comply with the PIM-SM protocol, but other protocols are possible.

A network device, such as network device 120, may add (or "join") a branch to a multicast tree or may remove (or "prune") a branch from a multicast tree by updating or changing the contents of a multicast tree state table, such as primary state table 366. Branches may be added or removed in response to receiving a "join/prune packet" from a neighboring node. For example, network device 120 may add a branch to a multicast tree (by updating primary state table 366, for example) in response to receiving a join/prune packet from neighboring network device 122. As another example, secondary RE 206-2 may add a branch (by updating a secondary multicast tree table, for example) after receiving a join/prune packet from primary RE 206-1. The join/prune packets may comply with the PIM-SM protocol, but other protocols are possible. As described herein and below with respect to FIG. 8, one or more embodiments may allow for the preservation (e.g., replication) of multicast tree state tables across multiple control planes in network devices, such as routers, in the event of the unavailability (e.g., failure or offline) of one of the control planes, for example.

Exemplary Processing

Figure 6:
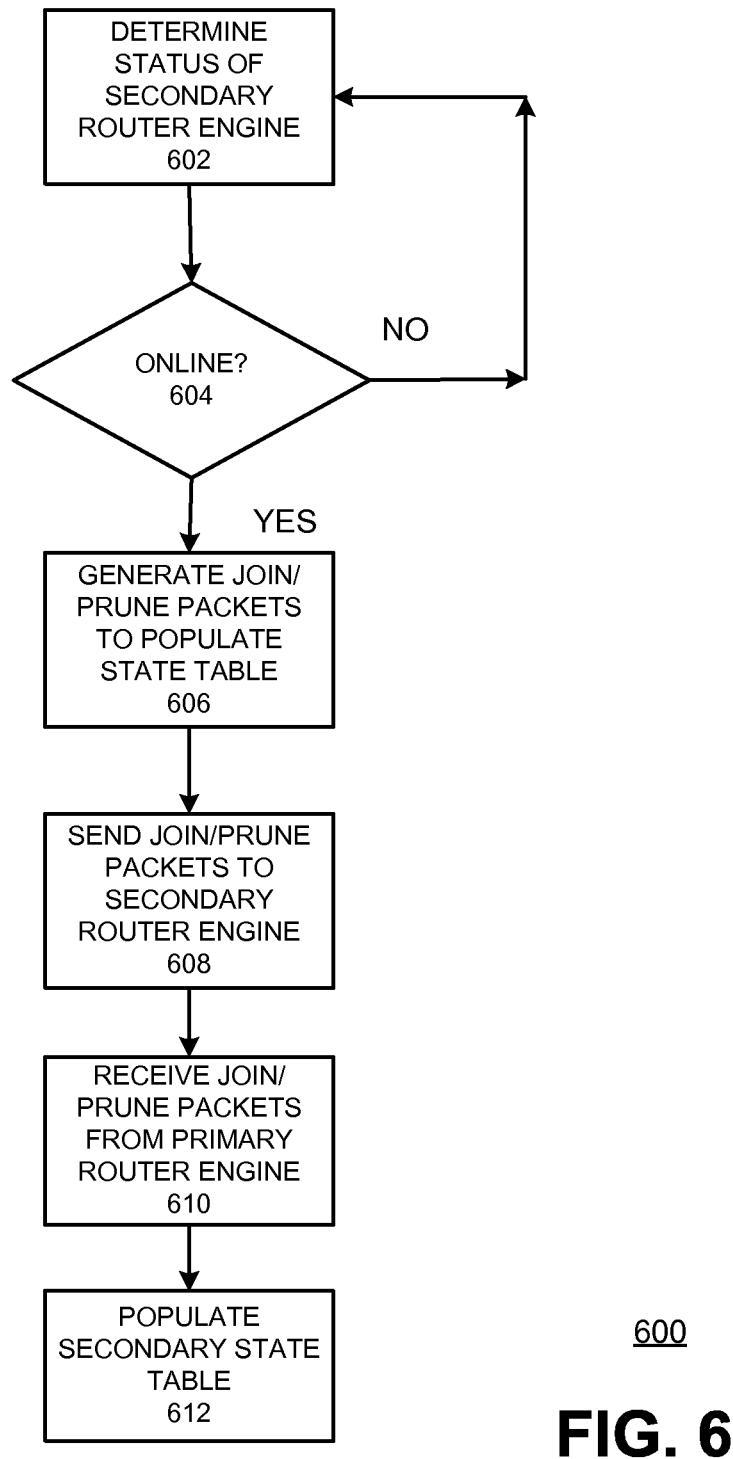
FIG. 6 is a flow chart of an exemplary process for populating a secondary multicast tree state table.

FIG. 6 is a flow chart of an exemplary process 600 for populating (e.g., creating) a secondary multicast tree state table. The status of the secondary RE may be determined (block 602). For example, primary RE 206-1 may be operating as described above, but secondary RE 206-2 may unavailable (e.g., fail or go offline). Primary RE 206-1 may determine the status of secondary RE 206-2 so that when secondary RE 206-2 comes online, primary RE 206-1 can prepare secondary RE 206-2 to be ready to function as a backup router engine.

If the secondary RE is not online (block 604: NO), then process 600 may return to block 602 where the status of the secondary router engine may be determined (block 602). When the secondary RE is online (block 604: YES), then join/prune data units may be generated (block 606). In one embodiment, the join/prune data units may be generated from the primary state table. For example, primary RE 206-1 may store primary state table 366, as shown in FIG. 4. When secondary RE 206-2 is online, primary RE 206-1 may generate one or more join/prune data units to reflect the current state of state table 366. In one embodiment, the join/prune data units may comply with the PIM-SM protocol, but other protocols are possible.

The join/prune data units may be sent (block 608). For example, primary RE 206-1 may send the generated join/prune data units (generated at block 606) to secondary RE 206-2 so that secondary RE 206-2 may construct (e.g., create or populate) a secondary state table. The join/prune data units may be received (block 610). Secondary RE 206-2 may receive the join/prune data units from primary RE 206-1. The secondary state table may be populated (block 612). For example, secondary RE 206-2 may use the join/prune data units to populate a secondary, e.g., backup, multicast tree state table.

Process 600 is described in the following example. Primary RE 206-1 may store primary state table 366, shown in FIG. 4, while secondary RE 206-2 is unavailable (e.g., offline for maintenance). When secondary RE 206-2 comes online (block 604: YES), primary RE 206-1 may generate join/prune data units representing the current state of state table 366 (block 606). One or more generated join/prune data units may include the information stored in record 452 of primary state table 366 (e.g., group address of 231.1.1.144, upstream interface of A, upstream address of 10.1.1.102, downstream interfaces of B, C, and D, and downstream addresses of 10.1.1.104, 10.1.1.106, and 10.1.1.122). One or more generated join/prune data units may include the information stored in record 454 of primary state table 366 (e.g., group address of 231.1.1.244, upstream interface of A, upstream address of 10.1.1.102, downstream interface of C, and downstream address of 10.1.1.106). Primary RE 206-1 may send the generated data units to secondary RE 206-2 (block 608).

Secondary RE 206-2 may receive the join/prune data units (block 610) and may populate, e.g., construct, a secondary multicast tree state table (block 612). FIG. 7 is a block diagram of an exemplary secondary multicast tree state table 700 that may be constructed from the join/prune data units received from primary RE 206-1. As shown in FIG. 7, secondary multicast tree state table 700 may have the same or similar fields as primary state table 366. After populating secondary state table 700, secondary state table 366 may contain the same information as primary state table 366, including records 452 and 454. Should primary RE 206-1 be unavailable (e.g., fail or be otherwise taken offline), secondary RE 206-2 includes a secondary state table 700 that is, in this example, identical to primary state table 366. Primary RE 206-1 may update and change primary state table 366. In this case, primary RE 206-1 and secondary RE 206-2 may maintain (e.g., update) secondary state table 700 so that it includes the same information as primary state table 366.

Variations of process 600 are possible. For example, new join/prune data units may be generated (block 606) and sent (block 608) as soon as secondary RE 206-2 comes online. This may allow for secondary state table 700 to be populated as soon as possible in case primary RE 206-1 becomes unavailable. In another embodiment, new join/prune data units may be generated (block 606) and sent (block 608) some time after secondary RE 206-2 comes online, such as when primary RE 206-1 receives join/prune data units from a neighboring device.

Figure 8:
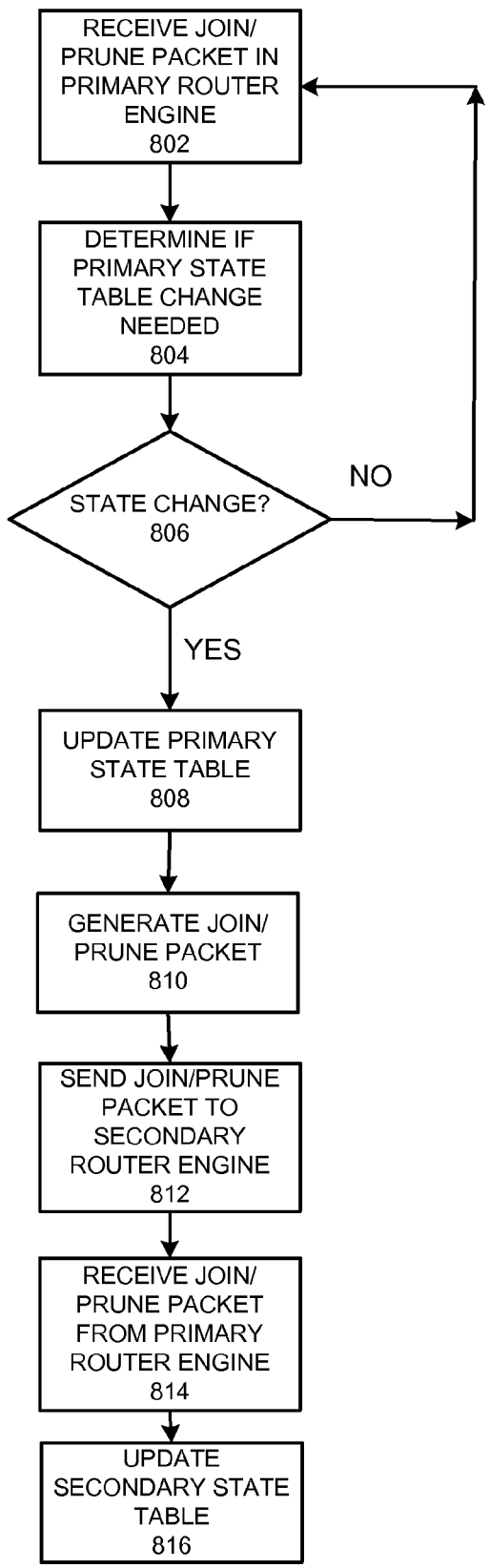
FIG. 8 is a flowchart of an exemplary process for maintaining a secondary multicast tree state table.

FIG. 8 is a flowchart of an exemplary process 800 for maintaining a secondary multicast tree state table. Process 800 is described with respect to network device 120 having already completed process 600 such that primary RE 206-1 and secondary RE 206-2 are online and include primary state table 366 and secondary state table 700, respectively.

A join/prune data unit may be received (block 802). For example, primary RE 206-1 in network device 120 may receive a join/prune data unit from a downstream neighbor, such as network device 122. The join/prune data unit may include, for example, information to add a branch to a multicast tree or to remove a branch from a multicast tree. The join/prune data unit may, however, include information that is already incorporated in primary state table 366, and primary state table 366 may not have to be changed or updated. For example, the join/prune data unit may be part of a periodic rebroadcasting of join/prune data units, which may occur in some protocols, such as PIM.

Whether the join/prune data unit may require a change to the multicast tree state table is determined (block 804). As stated above, the information in the join/prune data unit may already be reflected in primary state table 366. If the join/prune data unit does not require a change in the primary state table (block 806: NO), then process 800 may return to block 802 to receive another join/prune data unit. In this case, where primary state table 366 is not changed as a result of the received join/prune data unit, there may be no need to send any information to secondary RE 206-2 for updating secondary state table 700, for example.

If the join/prune data unit causes a change in the primary state table (block 806: YES), then the primary state table may be updated (block 808). As mentioned above, the join/prune data unit may include an instruction to add a branch or remove a branch from a multicast tree. For example, network device 120 may receive an instruction in the received join/prune data unit from a downstream network device, such as network device 122, to add a branch to a multicast tree that is not already reflected in primary state table 366. In this case, network device 122 may update primary state table 366.

A join/prune data unit may be generated (block 810). Because primary state table 366 has changed, a new join/prune data unit may be generated to reflect the change in primary state table 366 for the benefit of secondary state table 700. The join/prune data unit may be based on the change in primary state table 366. The join/prune data unit generated at block 810 may also be based on the join/prune data unit received at block 802, as the change in primary state table 366 may be based on the received join/prune data unit. The join/prune data unit may be sent to the secondary RE (block 812). In this case, the primary RE 206-1 may send the newly generated join/prune data unit to secondary RE 206-2 over bus 208. Determining whether there is a state change at block 806 may allow for the more efficient use of bus 208 by sending join/prune data units from primary RE 206-1 to secondary RE 206-2 only when needed for secondary state table 700 to stay up-to-date. For example, some multicast protocols, such as PIM-SM may rebroadcast join/prune data units on a periodic basis and many of these join/prune data units may not result in a change to primary state table 366. Determining whether there is a state change at block 806 may reduce the number of join/prune data units sent on bus 208 (thus, saving bandwidth) because some of the periodic rebroadcasts may not have to be reproduced and sent over bus 208. Generating a new join/prune data unit at block 810 may also allow for more efficient use of memory 360 because the join/prune data units received at block 802 may not have to be stored in memory 360. Instead, new join/prune data units may be generated at block 810 when needed.

The secondary RE may receive the join/prune data unit (block 814) and the secondary state table may be updated (block 816). For example, secondary RE 206-2 may receive the join/prune data unit from primary RE 206-1 and may update secondary state table 700. Once updated, secondary state table 700 may include all of the information in primary state table 366 and, thus, secondary RE 206-2 may be in condition to become the operating RE should primary RE 206-1 becomes unavailable.

Process 800 is described in the following example. Node 110 may request receipt of multicast stream 544 (e.g., the multicast identified by group address 231.1.1.244) as shown in FIG. 5. As such, network device 122 (acting on behalf of node 110) may send a join/prune data unit to network device 120 requesting that network device 120 transmit multicast stream 544 to network device 122 so that network device 122 may transmit multicast stream 544 to node 110. The join/prune data unit sent from network device 122 to network device 120 may include, for example, the group address identifying multicast stream 544 (e.g., 231.1.1.244) and the address of network device 122 (e.g., 10.1.1.122). In one embodiment, the join/prune data units may comply with the PIM-SM protocol, but other protocols are possible.

Primary RE 206-1 in network device 120 may receive the join/prune data unit sent by network device 122 (block 802). Primary RE 206-1 may analyze primary state table 366 and determine that the join/prune data unit sent from network device 122 is not reflected in primary state table 366, e.g., that there is no entry in primary state table 366 indicating that multicast stream 544 is to be forwarded to network device 122. Thus, primary RE 206-1 may determine that primary state table 366 needs to be updated (block 806: YES) to reflect the information in the join/prune data unit received from network device 120.

FIG. 9 is a block diagram of an exemplary updated primary multicast tree state table 366' (referred to herein as "updated state table 366'"). Primary RE 206-1 may update primary state table 366 to appear as it does in updated primary state table 366' (e.g., with an updated record 454' indicating that multicast data units with a group address of 231.1.1.244 may be forwarded over interface D (as indicated in downstream IF field 408) to network device 122 (e.g., to downstream address 10.1.1.122, as indicated in downstream address field 410)), as shown in FIG. 9.

Figure 10:
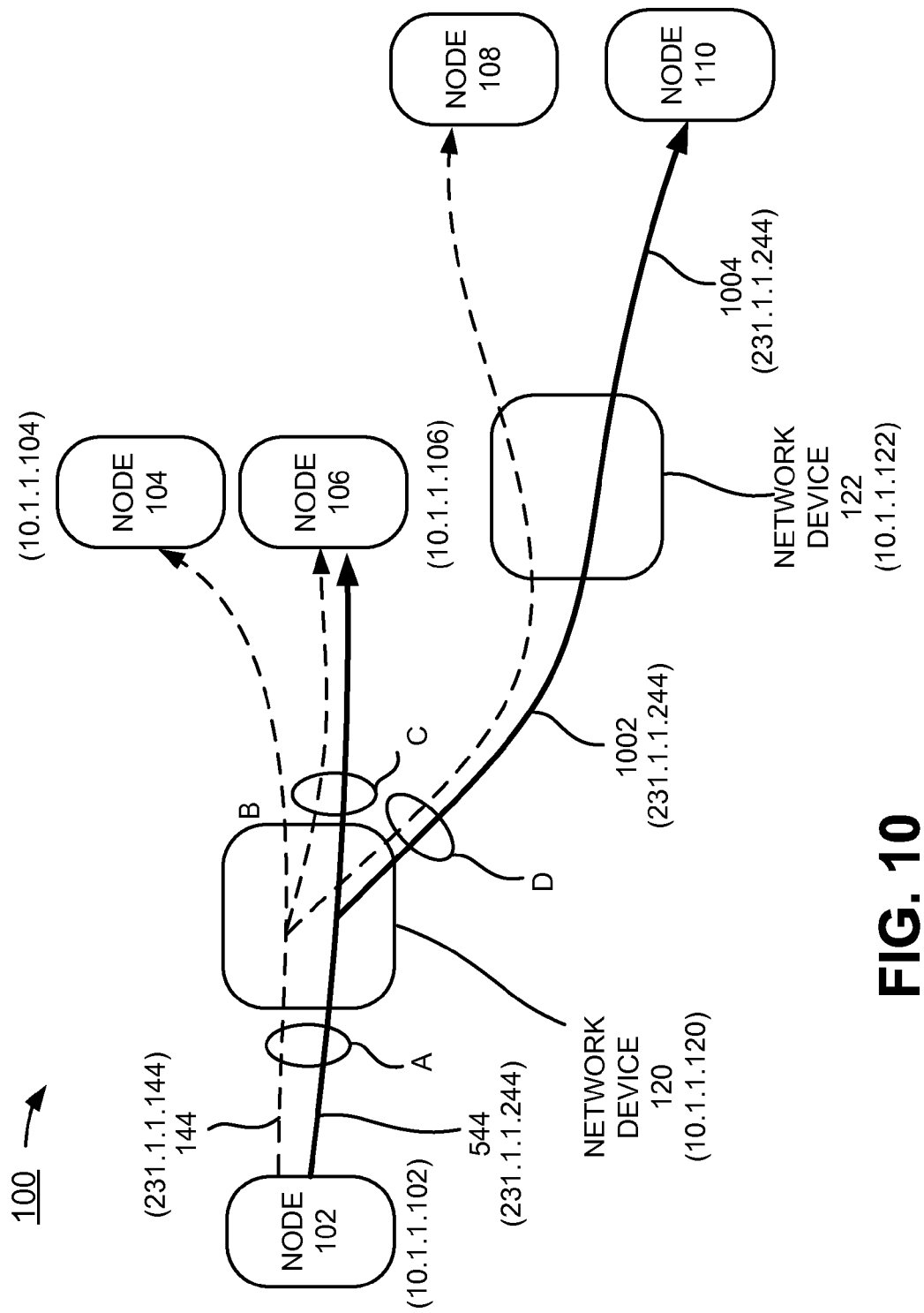
FIG. 10 is a block diagram of the exemplary network of FIG. 1 in a different state.

FIG. 10 is a block diagram of network 100 of FIG. 1 in the state described by updated primary state table 366'. As shown in FIG. 10, when a multicast data unit is received by network device 120 with the group address of 231.1.1.244, the data unit may be forwarded to network device 122 over interface D (e.g., as a segment 1002) according to updated primary state table 366'. Network device 122 may also forward such a data unit to node 110 (e.g., as a segment 1004).

Because the state of primary state table 366 changed to updated primary state table 366', primary RE 206-1 may determine that a join/prune data unit may be sent to secondary RE 206-2 so that secondary state table 700 may also be updated. Primary RE 206-1 may generate a join/prune data unit that includes, for example, the group address (e.g., 231.1.1.244), the downstream interface (e.g., interface D), and the downstream address (e.g., 10.1.1.122). In one embodiment, the join/prune data unit may comply with the PIM-SM protocol, but other protocols are possible.

FIG. 11 is a block diagram of an exemplary updated secondary multicast tree state table 700' (referred to herein as "updated secondary state table 700'"). Secondary RE 206-2 may receive the join/prune data unit and may update secondary state table 700 as shown in updated secondary state table 700' of FIG. 11. As shown in FIG. 11, updated secondary state table 700' includes an updated record 454' that reflects the same information, for example, as updated primary state table 366'. At this point, updated secondary state table 700' may be in a state to replace updated primary state table 366' should primary RE 206-1 be unavailable (e.g., fail or be taken offline for a different reason).

Process 800 may allow for the rapid preservation, e.g., backup or replication, of primary state table 366 in secondary state table 700. Such preservation may allow for little or no delay in forwarding newly arriving multicast flows in case of failure of primary RE 206-1.

Variations to exemplary process 800 are possible. For example, in one embodiment, process 800 may discard the join/prune data units received at block 802 because new join/prune data units may be generated at block 810. Thus, in this embodiment, generating a new join/prune data unit at block 810 may allow for more efficient use of memory 360 because the join/prune data units (particularly ones with redundant data) received at block 802 do not have to be stored in memory 360. Instead, new join/prune data units may be generated at block 810 when needed. Further, in this embodiment, the quantity of information sent from primary RE 206-1 over bus 208 to secondary RE 206-2 may be reduced because new join/prune packets generated at block 810 may include information only about state changes (block 806: YES), rather than redundant information from join/prune data unit received at block 802. In another embodiment, process 800 may forward (at block 812) the join/prune data unit received at block 802 instead if or in addition to generating a new join/prune data unit at block 810. For example, in this embodiment, the join/prune data unit received at block 802 may be forwarded when the join/prune data unit has not been seen before, e.g., is for a new group address.

In another embodiment, all join/prune data units received in block 802 may be forwarded to secondary RE 206-2 regardless of whether there is a state change (block 806). Determining whether there is a state change at block 806, however, may allow for more efficient use of bus 208 by reducing the quantity of information sent from primary RE 206-1 to secondary RE 206-2. For example, some multicast protocols, such as PIM-SM may rebroadcast join/prune data units on a periodic basis and many of these join/prune data units may not result in a change to primary state table 366.

In one embodiment, process 800 may send a join/prune data unit (block 810) as soon as possible after determining that an update to primary state table 366 may be necessary (block 806: YES). This embodiment may allow for secondary state table 700 to be updated as soon as possible in case of a failure of primary RE 206-1, for example. In another embodiment, process 800 may generate a join/prune data unit for sending to secondary RE 206-2 at periodic times.

Figure 12:
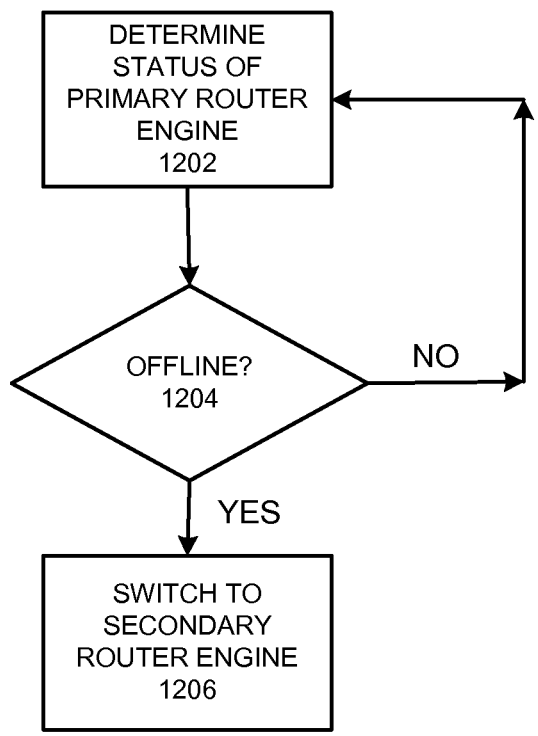
FIG. 12 is a flowchart of an exemplary process for switching between a primary router engine and a secondary router engine.

FIG. 12 is a flowchart of an exemplary process 1200 for switching between a primary RE and a secondary RE. The status of the primary RE may be determined (block 1202). For example, primary RE 206-1 may fail or be taken offline for a software upgrade. On the other hand, primary RE 206-1 may be operating normally. If the primary RE is not offline (block 1204: NO), then process 1200 may return to block 1202 where the status of the primary RE is determined again, e.g., the status of the primary RE may be continuously monitored. When primary RE 206-1 is online, then primary state table 366 may be considered available for routing multicast streams, such as streams 144 or 544.

If the primary RE is offline (block 1204: YES), then the network device may switch to the secondary RE (block 1206). For example, if primary RE 206-1 fails, then network device 120 may switch to secondary RE 206-2. Secondary RE 206-2 may include a populated and maintained secondary state table 700, which may allow for network device 120 to process multicast flows and requests without interruption. Because secondary RE 206-2 may include a populated and maintained secondary state table 700, RE 206-2 may not have to wait until the multicast tree protocol (e.g., PIM-SM) rebroadcasts multicast tree state information to populate its multicast tree state table. Thus, maintaining secondary state table 700 may allow for a more rapid switch to an up-to-date backup multicast state table, which may allow for continuous flow of multicast data in the event of a failure of a router engine or in the event of a software upgrade for a router engine. In addition, maintaining secondary state table 700 may also allow network device 120 to switch to secondary RE 206-2 with an up-to-date multicast state table without requiring additional resources from neighboring network device 122. For example, network device 120 may not need additional resources from neighboring network device 122 at the time of the switch, and secondary RE 206-2 may maintain secondary state table 700 without additional network traffic (e.g., traffic from backup protocols) from neighboring network device 122. When primary RE 206-1 is offline, then primary state table 400 may be considered unavailable for routing multicast streams, such as streams 144 or 544. As the operating RE, secondary RE 206-2 may wait for primary RE 206-1 to come back online and may re-populate primary state table 366 described above with respect to FIG. 6. In this situation, secondary RE 206-2 essentially becomes the "primary" RE and primary RE 206-1 essentially becomes the "secondary" RE.

Whether the primary RE 206-1 or secondary RE 206-2 is available or not (e.g., online or offline) may be determined in a variety of ways. For example REs 206 may receive and/or send data units to each other or another unit for determining whether the REs 206 are online.

The methods and devices described herein may allow for the preservation of multicast tree state tables across router engines, e.g., primary RE 206-1 and secondary RE 206-2. The preservation of multicast tree state tables may allow for continuous flow of multicast data in the event of a failure of a router engine or in the event of a software upgrade for a router engine. In addition, methods and devices described herein may allow for the efficient use of resources, such as bus 208, while preserving multicast tree state tables.

Methods and devices described herein may allow for the preservation of multicast tree state tables without additional resources from neighboring network devices. For example, in one embodiment described above, network device 120 (e.g., primary RE 206-1 and secondary RE 206-2) may populate and maintain secondary state table 700 without additional resources from neighboring network device 122. In another embodiment described above, secondary RE 206-2 may populate and maintain secondary state table 700 without secondary RE 206-2 participating in sending or receiving join/prune data units from neighboring devices, such as node 122, thus minimizing in-band overhead.

The labels "primary" and "secondary" are interchangeable. The operating RE may be considered the "primary" RE, while the backup RE may be considered the "secondary" RE. If the backup RE should become the operating RE, then the backup RE may be considered the "primary" RE. In other words, the primary RE may become the secondary RE and the secondary RE may become the primary RE. Likewise, the primary state table may become the secondary state table and the secondary state table may become the primary state table.

CONCLUSION

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above, such as with respect to FIGS. 6, 8, and 12, the order of the blocks may differ in other implementations. Moreover, non-dependent blocks may be implemented in parallel.

It will be apparent that aspects of the embodiments, as described above, may be implemented in many different forms of software, firmware, and hardware in the implementations illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A first device comprising:
   one or more processors to:
      update, based on a first plurality of data units received from a second device, a primary multicast tree state table regarding a plurality of next-hops in a multicast tree,
      generate a second plurality of data units based on the first plurality of data units,
         the second plurality of data units being differemt from the first plurality of data units, and
         the second plurality of data units comprising information regarding a next-hop for a multicast stream, and
      update, after updating the primary multicast tree state table, a secondary multicast tree state table based on the second plurality of data units,
         the secondary multicast tree state table being different from the primary multicast tree state table.

2. The first device of claim 1, further comprising:
   a primary control unit comprising a first memory to store the primary multicast tree state table;
   a secondary control unit comprising a second memory to store the secondary multicast tree state table; and
   a bus, coupling the primary control unit and the secondary control unit, to carry the second plurality of data units from the primary control unit to the secondary control unit.

3. The first device of claim 1, where the first plurality of data units and the second plurality of data units include at least one of a join packet or a prune packet.

4. The first device of claim 2,
   where the secondary multicast tree state table comprises at least a portion of information that is included in the primary multicast tree state table, and
   where the first device further comprises:
      a switch to switch from the primary control unit to the secondary control unit.

5. The first device of claim 2, where the one or more processors are further to:
   determine that the second memory is available,
   generate one or more data units that are indicative of a current state of the primary multicast tree state table after determining that the second memory is available, and
   populate the secondary multicast tree based on the one or more data units that are indicative of the current state of the primary multicast tree state table.

6. The first device of claim 1, further comprising:
   a plurality of control planes,
   the one or more processors being further to:
      update a multicast tree state table stored in each of the plurality of control planes based on the second plurality of data units.

7. The first device of claim 1, where the primary multicast tree state table comprises:
   a group address field,
   an upstream interface field,
   an upstream address field,
   a downstream interface field, and
   a downstream address field.

8. The first device of claim 1, where the primary multicast tree state table and the secondary multicast tree state table comply with the Protocol-Independent Multicast-Sparse Mode (PIM-SM) protocol.

9. The first device of claim 1, where, prior to updating the secondary multicast tree state table, the one or more processors are further to:
   check a status of the secondary multicast tree state table until the secondary multicast tree state table is determined to be available.

10. The first device of claim 7, where, when updating the secondary multicast tree state table, the one or more processors are to:
    update the secondary multicast tree state table following a predetermined delay after the secondary multicast tree state table is determined to be available.

11. The first device of claim 9, where, when updating the secondary multicast tree state table, the one or more processors are to:
    update the secondary multicast tree state table immediately after the secondary multicast tree state table is determined to be available.

12. A method comprising:
    updating, by a primary control unit of a device, a primary multicast tree state table based on a first plurality of data units,
        the first plurality of data units including information regarding a plurality of next-hops for a multicast stream in a multicast tree;
    formulating, by the primary control unit, a second plurality of data units based on the first plurality of data units,
        the second plurality of data units including information regarding a next-hop for the multicast stream; and
    updating, by a secondary control unit of the device, a secondary multicast tree state table after updating the primary multicast tree state table and based on the second plurality of data units.

13. The method of claim 12, further comprising:
    formulating another data unit that includes information indicative of updating the primary multicast tree state table; and
    updating the secondary multicast tree state table based on the other data unit.

14. The method of claim 12, further comprising:
    determining whether the primary multicast tree state table is available;
    routing the multicast stream based on first information stored in the primary multicast tree state table when the primary multicast tree state table is available; and
    routing the multicast stream based on second information stored in the secondary multicast tree state table when the primary multicast tree state table is not available.

15. The method of claim 13, further comprising:
    sending the other data unit from the primary control unit to the secondary control unit.

16. The method of claim 13, where the first plurality of data units, the second plurality of data units, and the other data unit comprise at least one of join packets or prune packets.

17. The method of claim 12, further comprising:
    determining that the information regarding the plurality of next-hops for the multicast stream in the multicast tree is not stored in the primary multicast tree state table before updating the primary multicast tree state table based on the first plurality of data units.

18. The method of claim 17, further comprising:
    receiving a third plurality of data units that includes other information regarding another plurality of next-hops;
    determining that the other information regarding the other plurality of next-hops is stored in the primary multicast tree state table; and
    ignoring the third plurality of data units without updating the primary multicast tree state table and without updating the secondary multicast tree state table after determining that the other information regarding the other plurality of next-hops is stored in the primary multicast tree state table.

19. A non-transitory computer-readable storage medium including instructions, the instructions comprising:
    one or more instructions that, when executed by the at least one processor of the first device, cause the at least one processor to:
        receive a first plurality of data units from a second device;
        update, based on the first plurality of data units, a primary multicast tree state table regarding a plurality of next-hops in a multicast tree;
        generate a second plurality of data units based on the first plurality of data units,
            the second plurality of data units being different from the first plurality of data units, and
            the second plurality of data units comprising information regarding a next-hop for a multicast stream;
        update a secondary multicast tree state table after updating the primary multicast tree state table and based on the second plurality of data units,
            the secondary multicast tree state table being different from the primary multicast tree state table; and
        forward a multicast data flow based on information stored in the secondary multicast tree state table when the primary multicast tree state table is unavailable.

20. The non-transitory computer-readable medium of claim 19, where the instructions further comprise:
    one or more instructions that, when executed by the at least one processor of the first device, cause the at least one processor to:
        determine that the primary multicast tree state table is available after a period of unavailability; and
        update the primary multicast tree state table after determining that the primary multicast tree state table is available, based on information stored in the secondary multicast tree state table.

* * * * *